United States Patent [19]

Kanner et al.

[11] 4,049,675

[45] * Sept. 20, 1977

[54] SULFOLANYLOXY ALKYL-POLYALKYL-SILOXANES

[75] Inventors: Bernard Kanner, West Nyack; Bela Prokai, Mahopac, both of N.Y.

[73] Assignee: Union Carbide Corporation, New York, N.Y.

[*] Notice: The portion of the term of this patent subsequent to Sept. 14, 1993, has been disclaimed.

[21] Appl. No.: 592,128

[22] Filed: June 30, 1975

[51] Int. Cl.$^2$ .................. C07D 333/48; C08J 9/00
[52] U.S. Cl. .................. 260/332.1; 260/332.3 R; 260/448.2 S; 260/448.2 H; 260/448.2 N; 260/2.5 AH
[58] Field of Search ............ 260/332.1, 448.2 S, 260/448.2 H, 448.2 N

[56] References Cited

U.S. PATENT DOCUMENTS

| | | | |
|---|---|---|---|
| 2,833,801 | 5/1958 | Holbrook | 260/448.2 |
| 3,325,439 | 6/1967 | Steinbach | 260/448.2 S |
| 3,457,290 | 7/1969 | Selin | 260/448.2 H |
| 3,846,462 | 11/1974 | Prokai et al. | 260/448.2 H |

OTHER PUBLICATIONS

Cooper, "Journal Amer Chem. Soc." vol. 76, pp. 3713–3716 (1954).

*Primary Examiner*—James O. Thomas, Jr.
*Assistant Examiner*—A. Siegel
*Attorney, Agent, or Firm*—Marylin Klosty

[57] ABSTRACT

A particular class of sulfolanyloxyalkyl-polyalkylsiloxanes are provided which consists essentially of: (1) monofunctional siloxy units (M°) the respective silicon atoms of which have two alkyls bonded thereto, the third silicon-bonded organic group being alkyl or sulfolanyloxyalky; (2) an average of from about 0.5 to about 10 moles of difunctional dialkylsiloxy units for every two moles of M°; from zero up to an average of about 10 moles, for every two moles of M°, of difunctional monoalkylsiloxy units in which the second organic group bonded to silicon is sulfolanyloxyalkyl, provided an average of at least about 0.5 and no more than about 10 moles of sulfolanyloxyalkyl groups are present in the sulfolanyloxyalkyl-polyalkylsiloxanes for every two moles of M°. The sulfolanyloxyalkyl-polyalkylsiloxanes are generally useful as surfactant providing compositions and find particular application as foam-stabilizing components of high resilience polyurethane foam formulations in which the organic polyol reactant comprises a polyether polyol reactant having an average primary hydroxyl content of at least about 35 mole percent based on the total moles of hydroxyl groups contained in said polyether polyol. The siloxanes of the invention are also useful as surfactant components of high resilience foam formulations in which the polyol reactant additionally comprises a polymer/polyether polyol.

11 Claims, No Drawings

SULFOLANYLOXY ALKYL-POLYALKYL-SILOXANES

BACKGROUND OF THE INVENTION

The present invention relates to a particular novel class of substituted polyalkylsiloxanes and to the use thereof in the formation of high resilience polyurethane foam.

It is well known to the art that urethane polymers are provided by the reaction of organic polyisocyanates and active hydrogen-containing organic compounds such as, for example, polyether polyols. It is also well known that the reaction is usually effected in the presence of one or more activators and that blowing action is provided when cellular products are desired. In producing conventional flexible polyether urethane foam, the rate of reaction and heat generated by the exothermic reaction between the polyisocyanate and polyether polyol is sufficient to cure the center of the foam product but the surface temperature usually does not rise high enough to cure the outside rapidly. Consequently, extended high temperature post cure treatment is necessary in commercial practice to provide a foamed product of satisfactory overall properties.

A relatively recent advance in polyurethane foam technology is the advent of reaction mixtures having a sufficiently high reactivity to provide faster and more complete reactions during polymer formation and expansion. As a result, overall processing time including high temperature post curing, if any, is substantially reduced. Basically, the more highly exothermic nature of such reaction mixtures is provided by the employment of polyether polyols having a high content of primary hydroxyl groups. Such foams are especially desirable for cushioning applications in view of their excellent physical properties. Among these properties are reduced combustibility relative to conventional polyether foam, low flex fatigue which means long life as a cushioning material, and high resiliency which is usually from about 55 to about 70 percent, as measured by standard test procedure ASTM D-1564-69. In view of this latter characteristic, such foams are commonly referred to as "high resilience" foam.

Because of the rapid buildup of gel strength of high resilience foam systems, the foam can sometimes be provided without a surfactant. Typically, however, high resilience foams produced without a surfactant or stabilizer have very irregular cell structure. It is usually desirable, therefore, to include a silicone surfactant as an additional component of high resilience foam formulations in order to control cell uniformity and to minimize the tendency of the foam to settle. Surfactants required for stabilization of conventional flexible polyether foam are unsatisfactory for high resilience foam because they overstabilize, causing extremely tight foam and excessive shrinkage. If the problem is sought to be corrected by reducing the concentration of such surfactants to a level which eliminates shrinkage, the cells are no longer stabilized satisfactorily and the foam structure becomes irregular and coarse.

It is known that specific low viscosity unmodified dimethylsilicone oils having a narrow low molecular weight distribution are useful stabilizers for high resilience foam. Among other classes of surfactants for high resilience foam are: (1) the relatively low molecular weight polysiloxane-polyoxyalkylene copolymers described in U.S. Pat. No. 3,741,917; (2) the particular class of aralkyl-modified siloxanes described in U.S. Pat. No. 3,839,384; (3) the cyanoalkyl- and cyanoalkoxy-modified siloxanes described in Belgian Pat. No. 809,978; and (4) the cyanoalkoxyalkyl- and cyanoalkoxyalkoxy-modified siloxanes described in Belgian Pat. No. 809,979.

It is a principal object of the present invention to provide a new class of siloxanes which are especially useful as surfactant components of polyurethane foam formulations containing a polyether polyol reactant having a high primary hydroxyl content, such as, in particular, high resilience foam formulations. Various other objects and advantages of the present invention will become apparent to those skilled in the art from the accompanying description and disclosure.

As a preface to the description of the present invention, it is noted that our copending application Ser. No. 592,129, filed concurrently herewith, entitled "Sulfolanyl-Bearing Organosilicone Polymers" describes and claims particular classes of sulfolanyloxyalkyl-substituted polyalkylsiloxane hydrides and sulfolanyloxyalkyl-substituted polyalkylsiloxane-polyoxyalkylene copolymers, and a method for providing flexible polyether and polyester urethane foam in the presence of the copolymers as foam stabilizers. Also noted in copending application Ser. No. 592,092, filed concurrently herewith in the name of Curtis L. Schilling, Jr. and entitled "Sulfolanyloxyalkyl Cyclic Polysiloxanes." The latter application describes and claims sulfolanyloxyalkylheptaalkylcyclotetrasiloxanes and self-equilibrated polymers thereof. The said copending applications, however, do not describe the particular class of siloxanes to which the teachings of the present invention pertain.

SUMMARY OF THE INVENTION

In accordance with one aspect of the present invention a particular class of sulfolanyloxyalkyl-substituted polyalkylsiloxanes are provided which consist essentially of: (1) monofunctional siloxy units (M°) the respective silicon atoms of which have two alkyls bonded thereto, the third silicon-bonded organic group being alkyl or sulfolanyloxyalkyl (Q); (2) an average of from about 0.5 to about 10 moles of dialkylsiloxy units (X) for every two moles of M°; and (3) from zero up to an average of about 10 moles, for every two moles of M°, of difunctional monoalkylsiloxy units (Y) in which the second organic group bonded to silicon is sulfolanyloxyalkyl, provided an average of at least about 0.5 and no more than about 10 moles of sulfolanyloxyalkyl groups (Q) are present in said sulfolanyloxyalkyl-polyalkylsiloxanes for every two moles of M°.

As indicated, the essential silicon-bonded sulfolanyloxyalkyl groups of the siloxanes of the present invention are collectively referred to herein by the symbol "Q" and include any of the monovalent radicals encompassed by the formula,

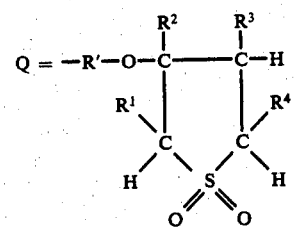

where: R' is bivalent alkylene having from two to eight carbon atoms; and $R^1$, $R^2$, $R^3$ and $R^4$ shown bonded to the carbon atoms in the two to five positions of the ring, respectively, are independently hydrogen or alkyl having from one to four carbon atoms.

The remaining organic groups bonded to silicon of the siloxanes described herein are alkyls, referred to herein by the symbol "R". As defined for the purpose of the entire specification, the symbol "R" denotes alkyls of one to four carbon atoms.

In the monofunctional siloxy units encompassed by M°, the respective silicon atoms are bonded to two alkyls (R), the third silicon-bonded organic group being sulfolanyloxyalkyl (Q) or alkyl (R). Thus, included within the scope of M° are monofunctional siloxy units having the following unit formulae which for brevity are also individually referred to herein as the M and M' units as shown:

$M = (R)_3SiO_{1/2}$
$M' = (Q)(R)_2SiO_{1/2}$

In any given siloxane composition of the present invention, the M° units may be the same as or different from one another.

In the difunctional siloxy units at least one of the two organic groups bonded to the respective silicon atoms is alkyl and the second silicon-bonded organic group is either alkyl as in the X units or the aforesaid sulfolanyloxyalkyl group (Q) as in the Y units when the latter units are present. Thus, the difunctional X and Y units have the following respective unit formulae:

$X = (R)_2SiO_{2/2}$
$Y = (Q)(R)SiO_{2/2}$

The sulfolanyloxyalkyl-modified polyalkylsiloxanes described herein may contain any combination or subcombination of the respective siloxy units within the scope of M°, X and Y provided the average composition contains from about 0.5 to about 10 moles of X and from about 0.5 to about 10 moles of Q for every two moles of M°. Usually, the sulfolanyloxyalkyl-polyalkylsiloxanes of the invention contain, on the average, from about one to about 8.5 moles of X units and no more than about six moles of Q, for every two moles of M°.

Consistent with the above definition and, from the standpoint of the nature and relative proportion of monomeric siloxy units, the sulfolanyloxyalkyl-polyalkylsiloxanes of the present invention have the following average composition, as expressed on the normalized basis of a total of two moles of monofunctional units (M°), that is, per average mole of polymer:

$$[(Q)(R)_2SiO_{1/2}]_q[(R)_3SiO_{1/2}]_r[(R)_2SiO_{2/2}]_x[(R)(Q)SiO_{2/2}]_y \quad (I)$$

wherein:

Q is silicon-bonded sulfolanyloxyalkyl as previously defined;

R is alkyl of one to four carbon atoms;

$q$ is zero or any positive number having an average value of no more than two, $r$ is zero or any positive number having an average value of no more than two, and the average value of the sum $q+r$ is two;

$x$ has an average value from about 0.5 to about 10; and $y$ is zero or any positive number having an average value of no more than about 10, provided the average value of the sum $q+y$ is at least about 0.5 and no more than about 10.

It is evident, therefore, that the sum $q+y$ corresponds to the total number of Q groups contained in an average mole of polymer and that when either $q$ or $y$ is zero, the other must be at least 0.5. It is also evident that when both $q$ and $r$ are positive numbers, the polysiloxanes of the invention contain both types of the respective monofunctional units.

The sulfolanyloxyalkyl-polyalkylsiloxanes of the invention are generally useful as surfactant providing compositions, and find particular application in the formation of high resilience foam.

Accordingly, another aspect of the present invention provides a method for producing high resilience polyurethane foam. The method comprises reacting and foaming a reaction mixture containing: (a) an organic polyol reactant comprising a polyether polyol having an average primary hydroxyl content between about 35 and about 90 mole percent and an average hydroxyl functionality from 2.1 to about 5; (b) an organic polyisocyanate reactant containing at least two isocyanate groups per molecule; (c) a blowing agent; (d) a catalyst comprising a tertiary-amine; and (e) a foam stabilizing component comprising the sulfolanyloxyalkyl-polyalkylsiloxanes of the present invention. When high resilience foam of enhanced load-bearing properties is desired, the organic polyol reactant additionally contains a polymer/polyether polyol produced by the in situ polymerization of at least one ethylenically unsaturated monomer in a polyether polyol.

In their utilization for forming high resilience foam, the sulfolanyloxyalkyl-polyalkylsiloxanes can be introduced to the foam producing reaction mixtures either as such, as a solution in a variety of organic liquids, in combination with various organic additives including organic surfactants, or in combination with one or more of the urethane-forming reactants, blowing agent or amine catalyst.

DETAILED DESCRIPTION OF THE INVENTION AND PREFERRED EMBODIMENTS

The functionality of the respective types of structural units encompassed by M°, X and Y of the siloxanes of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the siloxanes of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the M° units are chain terminating or end-blocking units and the respective oxygen atoms thereof are shared with silicon of one other unit which can be X and, when present, Y. On the other hand, X and Y are difunctional and thus the respective two oxygen atoms associated with each silicon atom thereof are shared with respective silicon atoms of other units. Thus, the reoccurring difunctional units may be distributed in the siloxane randomly, alternately, as sub-blocks of repeating units of the same type, or in any combination of such arrangements. Further, although the siloxane fluids of the invention can be discrete chemical compounds, they are usually mixtures of discrete siloxane species which differ in molecular weight and in the type, arrangement and relative proportions of units. Therefore, as expressed herein, the parameters employed to denote the relative proportions of units (e.g., x and y) are average values and are based on the relative proportions of reactants from which the respective units are derived. It is to be further understood that, consistent with convention in the art to which the present invention pertains, as expressed herein, the formulas of the siloxane polymers indicate their overall average empirical composition rather than any particular ordered arrangement of units or molecular weight of any particular discrete siloxane species. With this understanding, the average composition of the respective types of sulfolanyloxyalkylpolyalkylsiloxanes encompassed by Formula I above may be expressed by the following formulae wherein the various siloxy units are shown in chemically combined form:

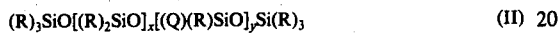  (II)

  (III)

  (IV)

wherein: the average value of $x$ ranges from about 0.5 to about 10, and is usually at least about one and no more than about 8.5; the total average number of sulfolanyloxyalkyl or Q groups is from about 0.5 to about 10 and is usually no more than about 6; and, in Formula IV, $q$ and $r$ are positive numbers provided their sum is two. It is evident, therefore, that: (1) in Formula II, the average value of $y$ is at least about 0.5 and no more that about 10; (2) in Formula III, $y$ can be zero or any positive number up to about 8; and (3) in Formula IV, the average value of $q+y$ is from about 0.5 to about 10, the maximum value of $y$ being 10 less the value of $q$. For example, in Formula IV, when $q$ is 0.5 (and thus $r$ is 1.5), $y$ may be zero, 0.1, 0.5, 0.8, 1.2, 1.5 and so forth up to a maximum value of 9.5. Further in regard to Formula IV, it is also evident that when $q$ has a value of less than 0.5 such as 0.25, the polymer must contain Y units and the corresponding minimum average value of $y$ is 0.25.

The silicon-bonded R groups are alkyls having from one to four carbon atoms including linear and branched alkyls. Illustrative of suitable groups encompassed by R are: methyl, ethyl, n-propyl, isopropyl, n-butyl and t-butyl. Of these, methyl is especially suitable. It is to be understood that the R groups may be the same throughout the siloxanes described herein or they may differ as between or within units without departing from the scope of this invention. For example, when the endblocking monofunctional units are M, that is, $(R)_3SiO_{1/2}$-, they may be trimethylsiloxy units and the difunctional units, $R_2SiO_{2/2}$, may be diethylsiloxy and/or methylethylsiloxy units.

In the Q substituents of the siloxanes of this invention, that is, in

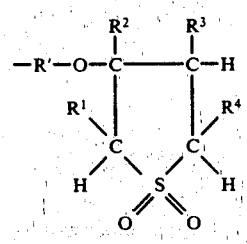

the $R^1$ through $R^4$ groups are, as previously defined, hydrogen or $C_1$ to $C_4$ alkyls. Usually, no more than two are alkyl as in the 2,4-dimethylsulfolan-3-yloxyalkyl nucleus. Preferably, each of $R^1$, $R^2$, $R^3$ and $R^4$ is hydrogen. The R' group of Q is a bivalent alkylene radical including linear and branched radicals, of the series, $-C_cH_{2c}-$, where c is an integer having a value from two to eight. Illustrative of the linear and branched saturated bivalent alkylene radicals encompassed by $-R'-$ are the following where the valence of the carbon atom designated in the one position is satisfied by a bond to silicon of the Y and/or M' units, the other valence of $-R'-$ being satisfied by the bond to oxygen of the sulfolanyloxy group of Q: ethylene; 1,3-propylene or trimethylene, 1,2-propylene; 2-methyl-1,3-propylene; 1-methyl-1,3-propylene; 1-ethyl-ethylene; 1,4-butylene or tetramethylene; 3-methyl-1,3-propylene; 3-ethyl-1,3-propylene; 1,5-pentylene or pentamethylene; 4-methyl-1,4-butylene; 1,6-hexylene or hexamethylene; 1-methyl-3,3-dimethyl-1,3-propylene; 1-ethyl-2,2-dimethyl-ethylene; 4,4-dimethyl-1,4-butylene; 3-propyl-1,3-propylene; 1-ethyl-1,4-butylene; 1-propyl-1,3-propylene; 1,8-octylene or octamethylene; and the like. Preferably, $-R'-$ has from 2 to 6 carbon atoms and most preferably has three or four carbon atoms.

Illustrative of the Y units $[(Q)(R)SiO_{2/2}]$ of the sulfolanyloxyalkyl-modified polyalkylsiloxanes described herein are the following:

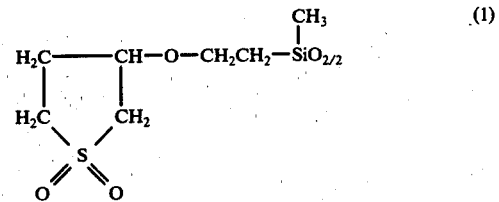  (1)

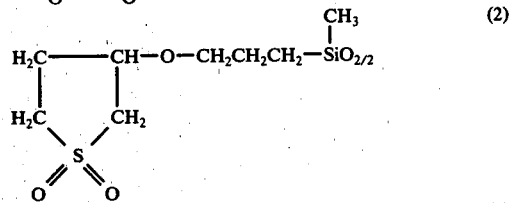  (2)

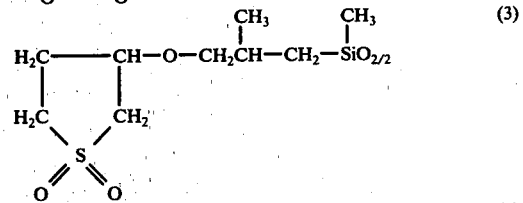  (3)

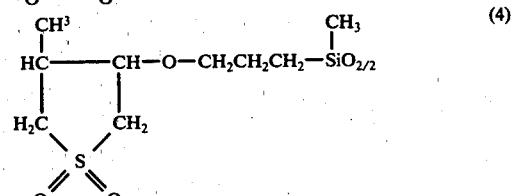  (4)

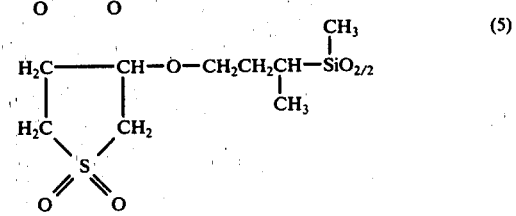  (5)

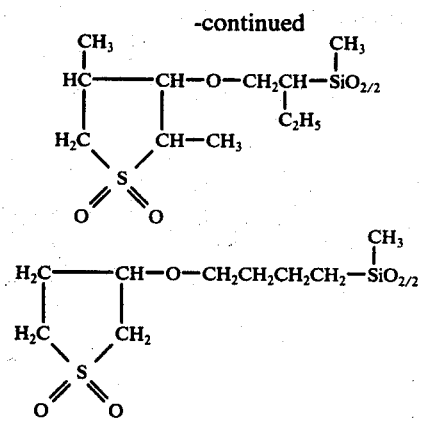

(6)

(7)

and corresponding units in which the silicon-bonded methyl group is ethyl, propyl, butyl, and the like. It is to be understood that the siloxanes of this invention may contain any one of the various Y units illustrated by the above as essentially the sole type of Q-substituted difunctional unit or the siloxanes may be comprised of any combination thereof.

Illustrative of the Q-substituted monofunctional units (M') are corresponding sulfolanyloxyalkyl dialkylsiloxy units such as: sulfolan-3-yloxyethyl dimethylsiloxy wherein Q is as in (1) above; 3-(sulfolan-3-yloxy)propyl dimethylsiloxy wherein Q is as in (2) above; 2-methyl-3-(sulfolan-3-yloxy)propyl dimethylsiloxy wherein Q is as in (3) above; 3-(4-methyl-sulfolan-3-yloxy)propyl dimethylsiloxy wherein Q is as in (4) above; 1-methyl-3-(sulfolan-3-yloxy)propyl dimethylsiloxy wherein Q is as in (5) above; 1-(2,4-dimethyl-sulfolan-3-yloxy)ethyl dimethylsiloxy wherein Q is as in (6) above; and 4-(sulfolan-3-yloxy)butyl dimethylsiloxy wherein Q is as in (7) above.

The generally preferred Q-substituted polyalkylsiloxanes of the invention are the compositions defined by above formula I-IV in which R is methyl and, in the Q group, each of $R^1$ through $R^4$ is hydrogen and the bivalent alkylene group, $-R'-$ (or $-C_cH_{2c}-$), has from 2 to 6 carbon atoms. Illustrative of such generally preferred compositions are those within the scope of Formula II, as more specifically defined by the following Formula II-A:

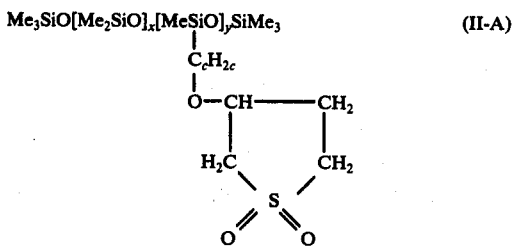

wherein: Me is methyl (-CH$_3$); $c$ is an integer from 2 to 6; the average value of $x$ is from about 0.5 to about 10, and is more usually from about one to about 8.5; and the average value of $y$ is from about 0.5 to about 10, and is more usually no more than about 6.

The sulfolanyloxyalkyl-polyalkylsiloxanes of the invention are prepared by any one of a number of different types of reactions including hydrosilation and equilibration reactions, as described below.

One method, referred to herein as Method A, comprises the reaction of (a) equilibrated unmodified polyalkylsiloxane hydrides and (b) alkenyl sulfolanyl ethers as the source of Q. The said ethers are collectively referred to herein by the symbol "$Q_o$" and have the formula,

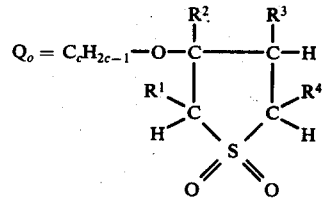

where, as defined with respect ot Q, $c$ is an integer having a value from two to eight, and $R^1$, $R^2$, $R^3$ and $R^4$ are independently hydrogen or alkyl having from one to four carbon atoms. The reaction of Method A involves hydrosilation of such alkenyl sulfolanyl ethers. In the application of Method A to polyalkylsiloxane hydrides in which the monofunctional units are trialkylsiloxy, the sulfolanyloxyalkyl-polyalkylsiloxane products are of the type encompassed by above Formula II. This embodiment of Method A is as illustrated by the following equation 1:

Equation 1:

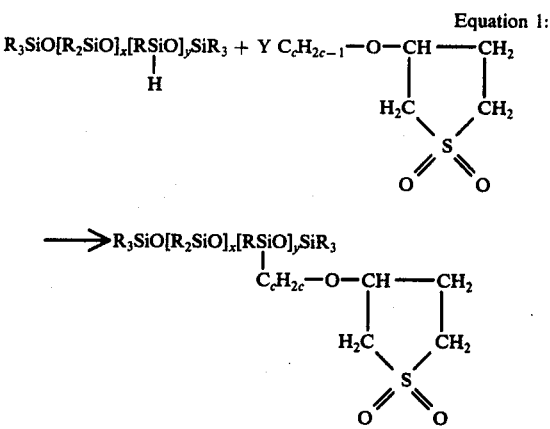

wherein: R is C$_1$ to C$_4$ alkyl; $c$ has a value from two to eight; the average value of $x$ is from about 0.5 to about 10; and the average value of $y$ is from about 0.5 to about 10. When the reaction of equation 1 is effected employing polymethylsiloxane hydrides and 3-allyloxysulfolane, the products are 3-(sulfolan-3-yloxy)propyl-polymethylsiloxanes having the average composition depicted by the following Formula II-B:

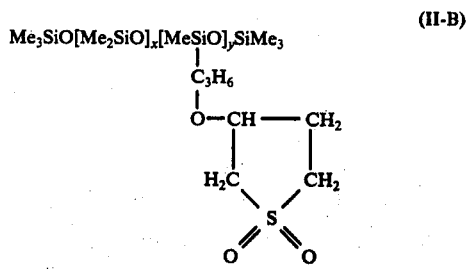

In the application of Method A to polyalkylsiloxane hydrides in which the monofunctional units are (H)(R)$_2$SiO$_{1/2}$, the sulfolanyloxyalkyl-polyalkylsiloxane products are of the type encompassed by Formula II.

This embodiment of Method A is as illustrated by the following equation 2:

Equation 2:

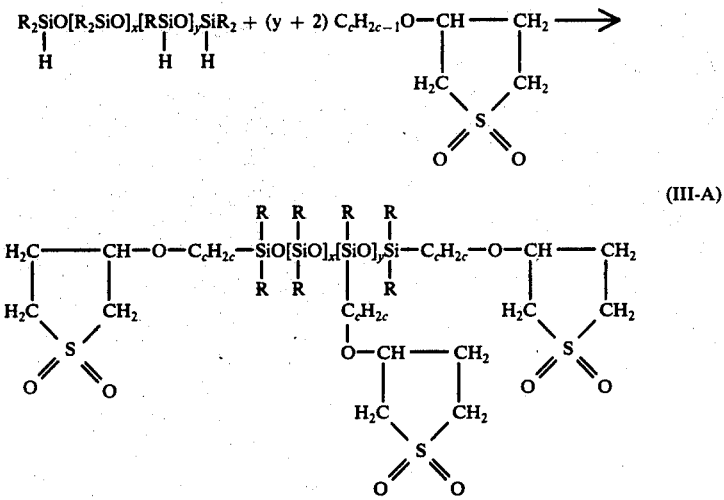

wherein: R, c and x are previously defined herein; and y is zero or a positive number having an average value no more than about 8. When the reaction of equation 2 is effected employing polymethylsiloxane hydrides and 3-allyloxysulfolane, the products are corresponding 3-(sulfolan3-yloxy)propyl-polymethylsiloxanes, that is, compositions having Formula III-A wherein R is methyl and c is three. Further in regard to the reaction illustrated by equation 2, when Y is zero, the sulfolanyloxyalkyl substituents are bonded soley to silicon of the monofunctional units, and the equilibrated polyalkylsiloxane hydride reactant has the average composition $(H)(R)_2SiO[R_2SiO]_xSi(R)_2(H)$.

Another embodiment of Method A comprises the utilization of equilibrated polyalkylsiloxane hydrides containing trialkylsiloxy and hydrogen-dialkylsiloxy monofunctional units, as the hydrosilation reactant to provide sulfolanyloxyalkyl-polyalkylsiloxanes of the type defined by above Formula IV. This embodiment is expressed by the following equation 3:

Equation 3:

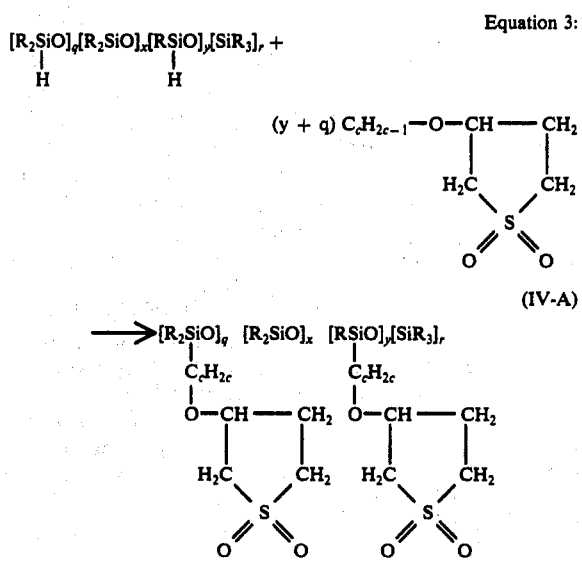

wherein as defined with respect to Formula IV: $q$ and $r$ are positive numbers, the sum $q+r$ being two; $x$ has an average value from about 0.5 to about 10; $y$ is zero or any positive number having a maximum average value of $10-q$; and the sum $q+y$ is at least about 0.5 and no more than about 10. Thus, when $y$ is zero, the minimum value of $q$ is 0.5. Likewise, when $q$ is less than 0.5, $y$ must be a positive number. When the reaction of equation 3 is effected employing polymethylsiloxane hydrides and 3-allyloxysulfolane, the products are corresponding 3-(sulfolan-3-yloxy)propyl-polymethylsiloxanes, that is, compositions having above Formula IV-A wherein R is methyl and c is three.

The hydrosilation reactions illustrated by equations 1, 2 and 3, which overall comprise the addition of Si-H to the alkenyl group of the sulfolane reactant, are effected in the presence of a platinum catalyst. Illustrative is platinum in the form of chloroplatinic acid dissolved, if desired, in a solvent such as tetrahydrofuran, ethanol, butanol, 1,2-dimethoxyethane or mixed solvents such as ethanol/1,2-dimethoxyethane. Also suitable as promoters of the hydrosilation reaction are the platinum catalysts prepared by reaction of chloroplatinic acid and an alcohol such as octanol as described in U.S. Pat. No. 3,220,972. It is to be understood, however, that other platinum derivatives known to the art as hydrosilation catalysts may also be used. The platinum is used in a catalytic amount such as, for example, from about 5 to about 400 parts by weight per million (p.p.m.) parts of the combined weight of the silicon-containing and sulfolane reactants. The more usual plantinum concentration is no more than about 200 p.p.m. Suitable reaction temperatures range from about room temperature (20° C.) to about 200° C., and are more usually from about 60° C. to about 160° C.

The reactions of equations 1 through 3 are carried out employing the alkenyl sulfolanyl ether reactant in an amount at least sufficient to react with the silicon-bonded hydrogen content of the Si-H reactant. From the standpoint of more effective and substantially complete reaction of silanic hydrogen, the unsaturated reactant is usually employed in excess of stoichiometry. Thus the alkenyl sulfolanyl ether reactant may be employed in an amount up to a 100 or more mole percent excess, although usually no more than about 60 mole percent in excess of the desired stoichiometry is required to obtain substantially complete reaction (95+ and more usually 98+ percent) of the silanic hydrogen. Thus, any residual silanic hydrogen contained in the sulfolanyloxyalkylpolyalkylsiloxanes of the invention usually corresponds to no more than about 5, and more usually no more than about 2, percent of the number of moles of Si-H contained in an average mole of the equilibrated polyalkylsiloxane hydride reactant.

The hydrosilation reaction may be conducted in the absence or presence of a solvent. Illustrative solvents are any of the following employed individually or in combination with one another: the normally liquid aromatic hydrocarbons such as benzene, toluene and xylene; alcohols such as n-propanol and isopropanol; ethers; ether alcohols; and other such non polar or polar solvents. Upon completion of the hydrosilation reaction, excess organic reactant and any solvent employed in the siloxane preparation, may be removed by conventional separation techniques to obtain the final product comprising the sulfolanyloxyalkyl-polyalkylsiloxane compositions of the invention. It is to be understood, however, that some portion or all of the solvent and excess alkenyl sulfolanyl ether reactant including byproducts thereof may remain in the product and that such diluted polymer compositions are within the scope and may be used in accordance with the teachings of this invention. The removal or neutralization of the platinum hydrosilation catalyst is usually desirable for long range product stability. Neutralization is readily effected by adding sodium bicarbonate to the reaction mixture followed by filtration of the resultant slurry to remove the neutralizing agent and platinum residues.

The polyalkylsiloxane hydride reactants employed in the hydrosilation reactions of equations 1 to 3 are in turn prepared by known equilibration reactions catalyzed by acid catalysts such as concentrated sulfuric acid, trifluoromethylsulfonic acid, and the like. Inasmuch as such equilibrated reactants are themselves usually mixtures of various discrete siloxane species, the sulfolanyloxyalkylpolyalkylsiloxanes produced therefrom are also usually provided as mixtures of various discrete siloxane species, as previously described herein.

In addition to their preparation by hydrosilation reactions, a second method, referred to herein as Method B, for preparing the sulfolanyloxyalkyl-polyalkylsiloxanes of the invention comprises equilibration of various combinations of the precursor reactants described below as the source of the indicated siloxy units and Q.

a. Hexaalkyldisiloxanes, $R_3SiOSiR_3$, when the endblocking units are $R_3SiO_{\frac{1}{2}}$, that is, when $q$ of Formula I is zero and $r$ is two, as specifically shown in Formula II.

b. Di[sulfolanyloxyalkyl]tetraalkyldisiloxanes, $(Q)(R)_2SiOSi(R)_2(Q)$, that is, when $r$ of Formula I is zero and $q$ is two, as specifically shown in Formula III. Such reactants in turn are prepared by hydrolysis of $(Q)(R)_2SiX°$ where $X°$ is chlorine or bromine, employing about one mole of water for every two moles of halide.

c. Cyclic dialkylsiloxane polymers, $[R_2SiO]_h$, where $h$ usually has an average value of from about 3 to about 6, as a partial or sole source of the difunctional dialkylsiloxy units (X), $R_2SiO_{2/2}$.

d. Trialkyl-endblocked dialkylsiloxane polymers, $R_3SiO(R_2SiO)_dSiR_3$, where $d$ has an average value of at least two and is usually no more than about 10, as the source of the endblocking units, $R_3SiO_{\frac{1}{2}}$, and as a partial or sole source of the dialkylsiloxy units (X), $R_2SiO_{2/2}$.

e. Sulfolanyloxyalkyl-alkylsiloxane cyclic polymers as the source of the Y units, $(Q)(R)SiO_{2/2}$. These polymers are formed by the hydrolysis of sulfolanyloxyalkyl-alkyl-dichlorosilanes, $(Q)Si(R)Cl_2$, followed by the base-catalyzed dehydration-cyclization of the hydrolyzate to form cyclics having the formula, $[(Q)Si(R)O]_w$, the average value of $w$ being 3 or more.

f. Sulfolanyloxyalkylheptaalkylcyclotetrasiloxanes, $[(Q)(R)SiO][(R)_2SiO]_3$, as the source of both the X and Y units. Such cyclics are in turn provided by the platinum-catalyzed hydrosilation reation between hydrogenheptaalkylcyclotetrasiloxanes, $[(H)(R)SiO][(R)_2SiO]_3$, and the above-described alkenyl sulfolanyl ethers $(Q_o)$. The said sulfolanyloxyalkylheptaalkylcyclotetrasiloxanes are described and claimed in the aforementioned copending application Ser. No. 592,092, filed concurrently herewith in the name of Curtis L. Schilling, Jr.

Illustrative of the reactions encompassed by Method B is the reaction of equation 4 shown below which comprises equilibration of reactants (a), (c) and (e). For convenience, polymeric reactants (c) and (e) are shown in equation 4 simply as the siloxy units which they provide to the equilibrated reaction product and, as in the case of above equations 1 to 3, the $R^1$ through $R^4$ groups of the sulfolanyl nucleus of Q are shown as hydrogen.

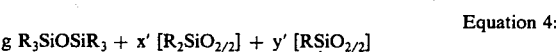
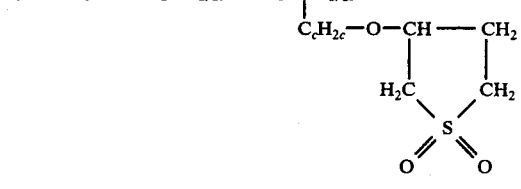

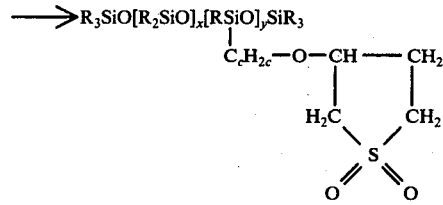

Formula II-C

In above equation 4 and other equations hereinbelow, $g$ represents the actual number of moles of the indicated reactant, and $x'$ and $y'$ represent the actual number of moles (or mole-equivalents) of the indicated monomeric units provided by the polymeric source of such units. It is to be understood, therefore, that $g$, $x'$ and $y'$ can be any positive numbers depending upon the scale on which the reactions are run, provided that when normalized on the basis of $g=1$ (that is, on the basis of an average mole of polymer of two moles of monofunctional units), the average value of each of $x'$ and $y'$ is from about 0.5 to about 10, thereby providing Q-substituted polyalkylsiloxanes wherein x and y have corresponding average values as previously defined.

In addition to the reaction of equation 4, the siloxanes encompassed by Formula II-C may also be prepared by equilibration of reactants (d), (c) and (e) as illustrated by equation 5 below, or by the equilibration of reactants (a) and (f), as illustrated by equation 6.

Equation 5:

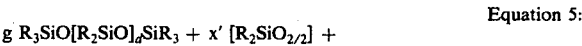

-continued

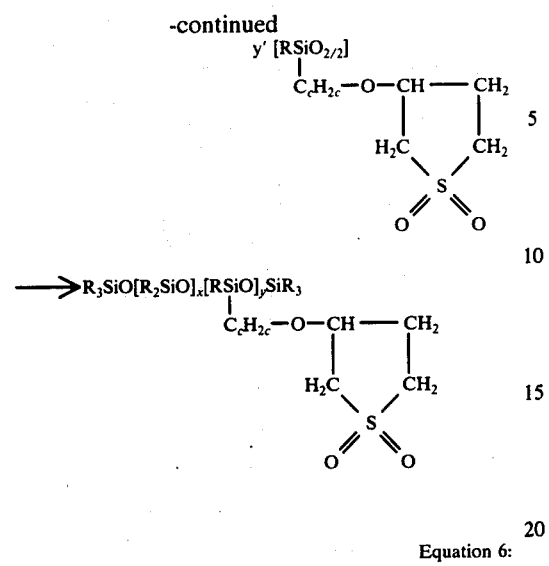

Equation 6:

g R₃SiOSiR₃ +

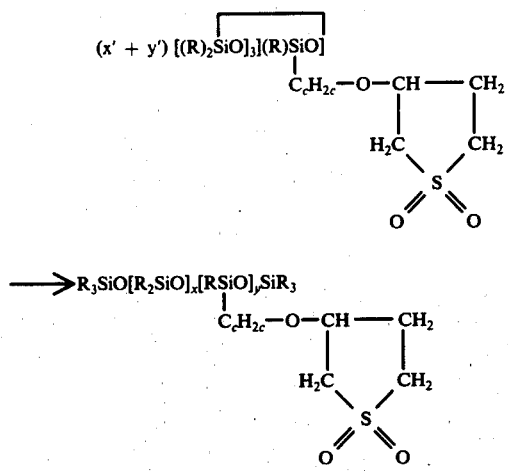

In the sulfolanyloxyalkyl-polyalkylsiloxanes produced by the reaction of equation 5, the average number of the $R_2SiO_{2/2}$ units (that is, the value of $x$) corresponds to the value of $[x'+(g \times d)]$, normalized on the basis of $g=1$, provided this value is no more than about 10. It is to be understood, therefore, that in equation 5, $x'$ may be zero. In the sulfolanyloxyalkyl-polyalkylsiloxanes produced by the reaction of equation 6, the ratio of $x:y$ will of course be 3:1, corresponding to the ratio of the X and Y units present in reactant ($f$). The ratio of $x:y$ in the equilibrated product may be adjusted to above or below 3:1, as desired, by effecting the reaction of equation 6 in the presence of reactant ($c$) as an additional source of X units, thereby increasing the ratio above three, or by the employment of an appropriate proportion of reactant ($e$) as an additional source of the Y units, thereby decreasing the ratio to less than three.

The Q-modified polyalkylsiloxanes encompassed by Formula III-A (shown in above equation 2) may also be prepared by effecting the equilibration reactions of equations 4–6 in the presence of reactant ($b$) instead of reactants ($a$) and/or ($d$), as illustrated by the following modification of equation 4.

Equation 7:

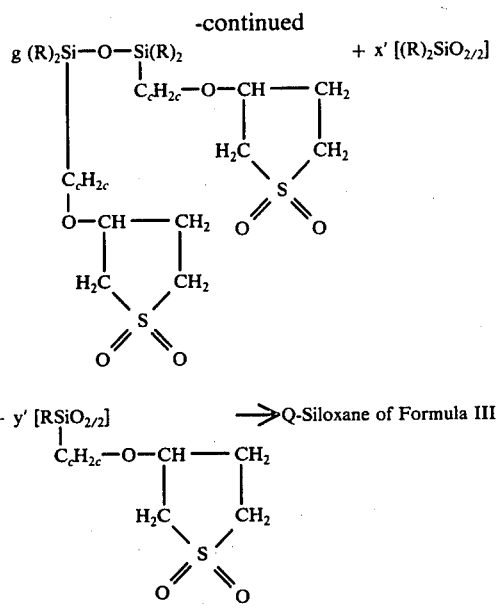

It is to be understood that the sulfolanyloxyalkyl-modified polyalkylsiloxanes having Formula III-A may also be prepared by effecting the reaction of equation 7 in the presence of reactant ($f$) as a partial or sole source of the Y units, that is, in addition to or in place of reactant ($e$) shown in equation 7.

The sulfolanyloxyalkyl-polyalkylsiloxanes encompassed by Formula IV and Formula IV-A (shown in equation 3) in which the monofunctional units are trialkylsiloxy (M) and Q-substituted dialkylsiloxy (M'), may also be provided by effecting the above equilibration reactions in the presence of a combination of respective precursor reactants of the M and M' units. For example, such Q-substituted siloxanes of the invention are provided by effecting the equilibration reaction of equation 4 in the presence of both $R_3SiOSiR_3$ and $(Q)(R)_2SiOSi(R)_2(Q)$ in relative proportions predetermined by the total number of moles of the respective M and M' units desired in any given average mole of polymer.

The above-described equilibration reactions are promoted by acid or basic catalysts. Suitable acid catalysts are trifluoromethylsulfonic acid ($CF_3SO_3H$) and concentrated (93–98 weight percent) sulfuric acid. The acid is employed in a catalytically effective amount such as from about 0.1 to about four weight percent, based on the total weight of reactants. The acid-catalyzed equilibration reactions are usually carried out with vigorous mechanical stirring at temperatures within the range from about 20° C. to about 120° C. at least until the reaction mixture becomes homogeneous. Effecting the reaction at temperatures from about 20° to about 95° C. usually provides a satisfactory rate of reaction. After completion of the reaction, the reaction product is neutralized with base such as sodium bicarbonate and filtered, sometimes adding a liquid hydrocarbon such as xylene or toluene or a filter aid to facilitate the filtration. When a diluent is used, it is conveniently separated from the reaction product by rotary vacuum evaporation. The Q-substituted polyalkylsiloxane fluids provided by the invention need not be fractionated such as by distillation but may be sparged (that is, stripped of lites) or unsparged.

Illustrative of suitable alkaline equilibration catalysts are potassium silanolate, cesium hydroxide and tetramethyl ammonium silanolate. Such promoters are usually employed in concentrations of from about 30 to about 50 p.p.m., based on the total weight of reactants. The temperature at which base-catalyzed equilibration is carried out depends largely on the catalyst employed. Thus, when tetramethyl ammonium silanolate is used, suitable reaction temperatures are from about 75° C. to about 100° C., preferably from about 30°-90° C. The other alkaline catalysts usually require higher temperatures such as at least about 150° C. to about 200° C.

The sulfolanyloxyalkyl-polyalkylsiloxane fluids of this invention are generally useful as surfactants and find particular application in the formation of high resilience foam. In their use as foam stabilizing components of high resilience foam formulations, the other essential types of components and reactants are an organic polyol reactant comprising a polyether polyol having a primary hydroxyl content from about 35 to about 90 mole percent, an organic polyisocyanate, an amine catalyst and a blowing agent. The sulfolanyloxyalkyl-polyalkylsiloxanes of the invention are present in the high resilience foam formulation in an amount between about 0.03 and about 3 parts by weight per one hundred parts by weight of total polyol reactant (p.p.h.p.). Usually, the concentration is from about 0.05 to about two p.p.h.p.

The polyether polyol of which the organic polyol reactant is comprised has an average of from 2.1 to about 5 hydroxyl groups per molecule and an average primary hydroxyl content between about 35 and about 90 mole percent based on the total moles of hydroxyl groups in the polyol. For convenience, this class of polyols are referred to herein as Polyol I. This class of polyether polyols are typically derived from propylene oxide and ethylene oxide and an organic initiator or mixture of initiators of the alkylene oxide polymerization. The average number of hydroxyl groups in the polyols encompassed by Polyol I is achieved by control of the functionality of the initiator or mixture of initiators used in producing the polyol. The high primary hydroxyl content is provided by capping of the polyoxyalkylene chains with at least a portion of the total ethylene oxide feed. Both the oxyalkylation and capping reactions are preferably effected in the presence of a basic material such as, for example, potassium hydroxide. The hydroxyl numbers of this class of polyether polyols may be from 84 to 18 and are usually no more than about 45. As is well known, the hydroxyl number of a polyol is the number of milligrams of potassium hydroxide required for the complete hydrolysis of the fully acylated derivative prepared from 1 gram of polyol. The hydroxyl number is also defined by the following equation which reflects its relationship with the functionality and molecular weight of the polyol reactant:

$$\text{OH No.} = \frac{56.1 \times 1000 \times f}{M.W.}$$

where:
OH = hydroxyl number of the polyol;
$f$ = average functionality, that is, average number of hydroxyl groups per molecule of polyol; and
M. W. = average molecular weight of the polyol.

In the polyols within the scope of Polyol I, the polyoxyalkylene chains may consist essentially of polyoxypropylene capped with oxyethylene or they may be constituted of polyoxypropylene and polyoxyethylene, provided the chains are endblocked by oxyethylene. When the polymerization is effected employing propylene and ethylene oxides, the respective alkylene oxides may be fed sequentially to provide sub-blocks of repeating units of the same type or they may be fed in admixture to provide a random distribution of units. The chains may also contain oxybutylene units provided such chains are also capped with oxyethylene. The terminal polyoxyethylene caps which endblock the polyoxyalkylene chains provide essentially only primary hydroxyl groups which in turn provide a more highly reactive polyether polyol for producing high resilience foam than polyols having terminal oxypropylene groups. The latter provide essentially only secondary hydroxyl groups (e.g., a ratio of secondary to primary hydroxyls of about 97 to 3).

Within the class of polyols defined by Polyol I, the generally preferred compositions are those having at least about 50 mole percent of primary hydroxyl groups based on the total moles of hydroxyl groups contained in the polyol. Usually the polyols have a primary hydroxyl content of no more than about 85 mole percent. The preferred hydroxyl functionality is at least 2.4. Most preferably, the minimum average number of hydroxyl groups per molecule is from about 2.8 to 3.2, and the maximum average hydroxyl functionality is about 4.8.

The average number of hydroxyl groups (i.e., functionality) in the polyether polyols encompassed by Polyol I is achieved by control of the functionality of the starter or mixture of starters used in producing the polyol. Thus, suitable starters or initiators of the alkylene oxide polymerization comprise compounds having an active hydrogen functionality (as hydroxyl or amino hydrogen) from about 3 to about 5, appropriate mixtures of such initiators with one another and/or with starters having an active hydrogen functionality outside of this range such as diols, hexols and the like. When a mixture of starters is used, the individual starters may be used in any relative proportions provided the average hydroxyl functionality of the polyether polyol produced therefrom is from 2.1 to about 5.

Suitable starters of the alkylene oxide polymerization include polyhydric compounds and primary and secondary polyamines having from three to five active hydrogen atoms (as —OH or —NH) and up to 15 carbon atoms. Illustrative of such starters are any of the following which may be employed individually or in combination with one another: glycerol; 1,2,6-hexanetriol; 1,1,1-trimethylolethane; 1,1,1-trimethylolpropane; 3-(2-hydroxyethoxy)- and 3-(2-hydroxypropoxy)-1,2-propanediols; 2,4-dimethyl-2-(2-hydroxyethoxy)methyl-pentanediol-1,5; 1,1,1-tris[(2-hydroxyethoxy)methyl]ethane; 1,1,1-tris[(2-hydroxypropoxy)methyl]propane; erythritol; pentaerythritol; ethylenediamine; and diethylenetriamine. As is evident, the employment of one or more of such triols, tetraols and polyamines as the initiator of alkylene oxide polymerization provides polyether polyols having an average hydroxyl functionality from 3 to 5.

Polyether polyols within the scope of Polyol I including those having an average of 2.1 hydroxyl groups per molecule, may also be prepared by the employment of any of the above initiators in combination with initiators having an active hydrogen functionality as low as two and more than five such as one or more of the following: ethylene glycol; diethylene glycol; propylene glycol; dipropylene glycol; 1,5-pentanediol; hexylene glycol; sucrose; sorbitol; methylglycoside; and the like.

In the high resilience foam-producing reaction mixtures described herein, the above-described polyether polyols referred to as Polyol I may be used as essentially the sole type of polyether polyol reactant or they may be employed in combination with other polyols to control the degree of softness or firmness of the foam and to vary the load-bearing properties. For example, when softer grade high-resilience foams are desired, Polyol I may be used in combination with polyether diols such as alkylene oxide adducts of a dihydric starter such as propylene and dipropylene glycols. When firm grades of highresilience foams having enhanced load-bearing properties are desired, the organic polyol reactant of the foam formulation preferably comprises a polymer/polyether polyol in addition to Polyol I. The polymer/polyols are produced by the in situ polymerization of at least one ethylenically unsaturated monomer in a polyether polyol. For convenience, the polymer/polyols are referred to herein as Polyol II. Such polyols have hydroxyl numbers from about 18 to about 65. In the preferred high resilience formulations employed in the practice of the present invention, the organic polyol reactant is constituted of from about 40 to about 80 weight percent of those polyether polyols encompassed by Polyol I and correspondingly from about 60 to about 20 weight percent of the polymer/polyols encompassed by Polyol II. Usually, the high resilience formulation contains no more than about 50 weight percent of polymer/polyol based on the weight of total polyol reactant contained in the formulation.

In forming the polymer/polyols, one or more ethylenically unsaturated monomers is dissolved or dispersed in a polyether polyol and the polymerization is effected in the presence of a free radical catalyst. Especially suitable substrate polyols for producing such compositions are those polyether polyols encompassed by the definition of Polyol I. Also useful but less preferred as the substrate polyol are conventional polyether polyols outside the scope of Polyol I, that is polyether polyols not having the high primary hydroxyl content of Polyol I. Such additional substrate polyols may have average hydroxyl functionalities from 2 to 5 and hydroxyl numbers from about 20 to about 125, and are produced by initiating the alkylene oxide polymerization (preferably propylene oxide, ethylene oxide and combinations thereof) with any initiator having an active hydrogen functionality of at least two. Illustrative of the ethylenically unsaturated monomers are vinyl compounds having the general formula,

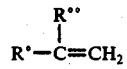

wherein: R° is hydrogen, methyl or any of the halogens (i.e., fluorine, chlorine, bromine or iodine); and R°° is R+, cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alphamethylstyrene, methyl methacrylate, and butadiene. In general, such compositions are prepared by polymerizing the monomers in the substrate polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and axobis(isobutyronitrile).

The polymer/polyol compositions generally contain from about 3 to about 50, and more usually no more than about 40, weight percent of the vinyl monomer or monomers polymerized in the substrate polyether polyol. Especially effective polymer/polyols encompassed by Polyol II are those having the following composition:

A. from about 10 to about 30 weight percent of a copolymer of (1) acrylonitrile or methacrylonitrile, and (2) styrene or alpha-methylstyrene, the said copolymer containing from about 40 to 85 and from about 60 to 15 weight percent of monomeric units of (1) and (2), respectively; and B. from about 90 to about 70 weight percent of one or more of the aforementioned types of substrate polyether polyols of which the polyols encompassed by Polyol I are especially preferred.

The isocyanate reactant of the high resilience foam formulations employed in the practice of the present invention may be any of the polyisocyanates known to the art of cellular polyurethane formation. Generally useful are organic polyisocyanates having an -NCO functionality of at least two and include aliphatic and aromatic polyisocyanates which are discrete chemical compounds, polyfunctional isocyanates produced as residue products in the manufacture of such compounds or polymeric aryl isocyanates, including any combination thereof. Among such suitable polyisocyanates are those represented by the general formula:

$$Q'(NCO)_i$$

wherein: $i$ has an average value of at least two and is usually no more than six, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of such polyisocyanates for use in preparing high resilience polyurethane foam as described herein are any of the following including mixtures thereof: 1,6-hexamethylenediisocyanate; 1,4-tetramethylenediisocyanate; bis(2-isocyanatoethyl)fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyldiisocyanate; durylene diisocyanate; triphenylmethan-4,4',4''-triisocyanate; and other organic polyisocyanates known to the polyurethane art. Of the aforesaid types of polyisocyanates, those containing aromatic nuclei are generally preferred.

Also useful as the polyisocyanate reactant are polymeric aryl isocyanates having units of the formula:

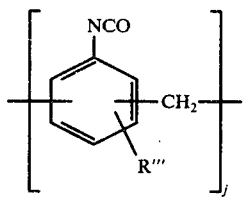

wherein R''' is hydrogen and/or lower alkyl (e.g., methyl), and j has an average value of at least 2.1. Usually, R''' is hydrogen and j has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50–500 centipoise at 25° C.) liquids having average isocyanato functionalities in the range of about 2.25 to about 3.2 or higher, and free —NCO contents of from about 25 to about 35 weight percent, depending upon the specific aniline-to-formaldehyde molar ratio used in the polyamine preparation. Suitable polymeric isocyanates of this type for use in the practice of this invention are those available commercially as PAPI 901 (The Upjohn Company) and NIAX Isocyanate AFPI (Union Carbide Corporation).

Also useful as polyisocyanate reactants are tolylene diisocyanate residues obtained from the manufacture of the 2,4- and 2,6-isomers of tolylene diisocyanates, and having a free —NCO content of from about 30 to about 50 weight percent. For example, as is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 percent 2,4-tolylene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, even often solid, materials. It is the evaporator tail material which is commonly referred to as tolylene diisocyanate residue.

Other useful polyisocyanate reactants are "liquid MDI," and combinations of diisocyanates with polymeric isocyanates having an average of more than two isocyanate groups per molecule. Illustrative of such combinations are: a mixture of 2,4-tolylene diisocyanate, 2,6-tolylene diisocyanate and the aforesaid polyphenylmethylene polyisocyanates and/or the aforementioned tolylene diisocyanate residue product.

Especially useful as the polyisocyanate reactant of the high resilience foam formulations described herein are combinations of isomeric tolylene diisocyanates and the above-described polymeric aryl isocyanates. Employed with particular advantage are mixtures containing from about 60 to about 90 weight percent of the isomeric tolylene diisocyanates and from about 40 to about 10 weight percent of the polyphenylmethylene polyisocyanates, in order to enhance the average —NCO functionality and thus the reactivity of the reaction mixture. When the high resilience formulations contain the isomeric diisocyanates as essentially the sole source of reactive —NCO, it is often desirable to include minor amounts of crosslinking agents, such as up to about 1.5 parts by weight per one hundred parts of polyol reactant.

On a combined basis, the polyol rectant and organic polyisocyanate usually constitute the major proportion by weight of the polyurethane-forming reaction mixture. In general, the polyisocyanate and polyol reactants are employed in relative amounts such that the ratio of total -NCO equivalents to total active hydrogen equivalent (of the polyol and water present as a blowing agent) is from 0.8 to 1.5, usually from 0.9 to 1.35, equivalents of —NCO per equivalent of active hydrogen. This ratio is known as the Isocyanate Index and is often also expressed as a percent of the stoichiometric amount of polyisocyante required to react with total active hydrogen. When expressed as a percent, the Isocyanate Index may be from 80 to 150, and is usually within the range from about 90 to about 135. More usually, the Isocyanate Index is no more than about 115.

The high resilience foam-forming reaction is effected in the presence of a catalytically effective amount of a catalyst comprising an amine which is usually a tertiary-amine. Among the suitable classes of suitable amine catalysts are those consisting of carbon, hydrogen and amino nitrogen. Illustrative of such suitable hydrocarbyl amine catalysts are the following mono- and polyamines: trimethylamine; triethylamine; tributylamine; N,N-dimethylcyclohexylamine; N,N-dimethylbenzylamine; triethylenediamine; N,N,N',N'-tetramethylethylenediamine; N,N,N',N'-tetraethylethylenediamine; N,N,N', N'-tetramethyl-1,3-butanediamine; and 1,1,4,7,7-pentamethyldiethylenetriamine.

Another class of suitable tertiary-amines which may be present in the catalyst systems of the present invention are the beta-amino carbonyl compounds described in U.S. Pat. No. 3,821,131 such as, in particular, the 3-dialkylamino-N,N-dimethylpropionamides. Of this class, 3-dimethylamino-N,N-dimethylpropionamide is a particularly effective component of the catalyst system of high resilience foam formulations.

A third class of suitable tertiary-amine catalysts are bis[2-(N,N-dimethylamino)alkyl]ethers such as, in particular, bis[2-(N,N-dimethylamino)ethyl]ether. Also useful is distilled residue product formed in the manufacture of the latter compound by the method of copending application Ser. No. 477,810, filed June 10, 1974, in the names of J. F Ferrell and F. Popplesdorf now U.S. Pat. No. 3,957,875, granted May 18, 1976

Other classes of tertiary-amines which are suitably employed as catalysts of the high resilience formulations described herein are: N,N-dialkylalkanolamines such as, in particular, N,N-dimethylethanolamine; the betaminopropionitriles described in copending application Ser. No. 369,556, filed June 13, 1973, in particular, 3-dimethylaminopropionitrile; and saturated heterocyclic tertiary-amines such as N-methylmorpholine, N-ethylmorpholine, 1,4-dimethylpiperazine and N-(2-hydroxyethyl)piperazine.

It is to be understood that the amine catalyst system of the high resilience foam formulation may comprise a combination of any of the above tertiary-amines such as a combination of the aforementioned triethylenediamine, is[2-(N,N-dimethylamino)ethyl]ether and 3-dimethylamino-N, The amide catalyst is present in the final urethane-producing reaction mixture in a catalytically effective amount. Generally, the concentration of total amine is within the range from about 0.02 to about 6 parts by weight (exclusive of any carrier solvent such as dipropylene glycol or other non catalytic additive) per one hundred parts by weight of the total polyol reactant (p.p.h.p.) contained in the reaction mixture. Usually, the total amine concentration is from about 0.05 to about 4 p.p.h.p.

It is often desirable to include as a further component of the foam-forming reaction mixture a minor amount of an organic compound of tin. Such supplementary tin catalysts include any of the following: stannous salts of carboxylic acids such as stannous octoate, stannous oleate, stannous acetate and stannous laurate; dialkyltin dicarboxylates such as dibutyltin dilaurate, dibutyltin diacetate, dialurltin diacetate, dibutyltin di(2-ethylhexanoate), dibutyltin maleate, dioctyltin diacetate, and the like; as well as dialkyltin oxides, trialkyltin oxides, tin mercaptides such as, for example, di-n-octyl tin mercaptide, and the like. Of these, the dialkyltin salts of carboxylic acids are especially suitable. When a tin compound is used as a co-catalyst, the concentration thereof is generally from about 0.001 up to about 2 parts by weight per 100 parts by weight of total polyol reactant contained in the high resilience foam formulation.

Foaming is accomplished by the presence in the foam formulation of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in providing high resilience foam as described herein include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; dichloromonofluoromethane; 1,1-dichloro-1-fluoroethane; 1,2,2-trifluoro-1,1,2-trichloroethane; 1,1,1-trifluoro-2-fluoro-3,3-difluoro-4,4,4-trifluorobutane; hexafluorocyclobutene; octafluorocyclobutane; and the like.

The generally preferred method of foaming is the use of water as the sole source of blowing action or a combination of water plus a fluorocarbon blowing agent such as trichlorofluoromethane. When water is used as the sole or partial source of blowing action, generally no more than about 10 p.p.h.p. of water is introduced to the foam system, the more usual water concentration being from about one to about 4 p.p.h.p. High resilience foam is most usually all water blown. When a fluorocarbon blowing agent is used in conjunction with water, the fluorocarbon is usually used in a minor proportion such as up to about 10 weight percent of total blowing agent.

The relative amounts of various components present in the foam-producing reaction mixture are not narrowly critical. The organic polyol reactant and polyisocyanate reactant are present in the foam-producing formulation in a major amount. The relative amounts of these two components is the amount required to produce the urethane structure of the foam and such relative amounts are well known in the art. The source of the blowing action such as water, auxiliary blowing agents, catalyst and the sulfolanyloxyalkyl-polyalkylsiloxane foam stabilizer are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the sulfolanyloxyalkyl-polyalkylsiloxanes of this invention are present in a foam-stabilizing amount, that is, in an amount sufficient to stabilize the foam. The preferred amounts of these various components are as given hereinabove.

If desired, other additional ingredients can be employed in minor amounts in producing high resiliency foam in accordance with the teachings of this invention. Illustrative of such additional components are inhibitors as exemplified by 2,6-di-tert-butyl-4-methylphenol ("Ionol"), added for the purpose of reducing any tendency of the foam to hydrolytic or oxidative instability. Flame retardants can also be used such as, for example, tris(2-chloroethyl)phosphate, as well as other flame retardants such as those described in U.S. Pat. No. 3,846,462 (beginning with column 34, line 29, through column 35, line 34) the disclosure of which in this respect is incorporated as part of the present disclosure by reference thereto.

Other components which may be present in the high resilience foam formulations described herein are polyalkylsiloxane oils such as dimethylsiloxane oils. The latter may be added as such to the foam formulation or they may be introduced as components of the sulfolanyloxyalkyl-polyalkylsiloxanes of the invention. For example, the equilibrated polyalkylsiloxane hydrides employed as hydrosilating agents in the preparation of the siloxanes of the invention may contain dimethylsiloxane species or such species may form during the preparation of the siloxanes of the invention by equilibration reactions as previously described herein. The high resilience foam formulations described herein may also contain the organosilicones described in the aforementioned U.S. Pat. Nos. 3,741,917 and 3,839,384, and Belgian Pat. Nos. 809,978 and 809,979. While the addition of such dimethylsiloxane oils or other organosilicones is not required, they may help expand the usefulness of the sulfolanyloxyalkyl-polyalkylsiloxanes described herein by increasing their adaptability to a variety of foam formulations.

Illustrative of further additives that can be present in the high resilience foam formulations employed in the practice of the invention are: cross-linking agents such as glycerol, diethanolamine, triethanolamine and their oxyalkylene adducts; additives to enhance load-bearing properties; carrier or solvent media for the amine catalyst (e.g., dipropylene glycol) and for the sulfolanyloxyalkyl-polyalkylsiloxanes of the invention; as well as fillers, dyes, pigments, anti-yellowing agents, and the like.

The foam stabilizers comprising the sulfolanyloxyalkyl-polyalkylsiloxanes of the invention may be introduced to the high resilience formulations as a 100 percent active stream or they can be added in dilute form in suitable carrier and solvent media. For example, it may be desirable, particularly in commercial operation to employ the siloxane fluids of the invention in a diluted form, that is in the form of a siloxane fluid-solvent solution premix or a siloxane fluid-solvent-catalyst solution premix. Such solution premixtures can help serve to eliminate any mixing, metering, or settling problems. Moreover, fewer streams of ingredients may be needed at the mixing head of the operational apparatus. Of considerable importance is that the formulator has the latitude to select the particular solvent which best suits the system and minimize or eliminate any loss of foam properties. Siloxane fluid-solvent-catalyst premixes can also be used since the selected solvent can be one which serves the dual role of solvent for the catalysts as well as the siloxane fluid. This option of formulating a premix simplifies the foaming operation and improves the precision of metering ingredients.

Illustrative of suitable types of diluents for the Q-modified polyalkylsiloxanes of the invention are: normally liquid aliphatic and aromatic unsubstituted and halogen-substituted hydrocarbons (e.g., heptane, xylene, toluene, chlorobenzenes, and the like); and normally liquid oxygen-containing compounds such as dialkylphthalates (e.g., dioctylphthalate), mono-ols, diols, triols and other polyols including the polyether polyols described above as Polyol I, as well as non ionic and anionic silicon-free organic surfactants, and any combination of such oxygen-containing liquid materials. When employed, the diluent selected is preferably one in which the sulfolanyloxyalkyl-polyalkylsiloxane fluid is substantially soluble. For example, it is preferred that at least five parts by weight of the Q-modified siloxane oil be soluble in 95 parts by weight of diluent. More preferably, the minimum percentage of sulfolanyloxyalkyl-modified siloxane fluid in the siloxane fluid-solvent or siloxane fluid-solvent-catalyst solutions should be in the range of at least about ten to at least about 30 weight percent. It is to be understood, of course, that such solvents need not be employed and that the maximum percentage of sulfolanyloxyalkyl-modified siloxane fluid in said solvent solutions is not critical. Moreover, when employed, such solvent solutions should of course be correlated to the amount of active sulfolanyloxyalkyl-modified siloxane fluid that may be employed per one hundred parts by weight of the organic polyol reactant as outlined above. The same correlation should also be made with regard to catalyst when a siloxane fluid-solvent-catalyst solution is employed. Preferably the solvent for the sulfolanyloxyalkyl-modified siloxane fluid is a hydroxyl-substituted organic compound such as hydroxyl-terminated organic ether compounds. More preferably they are polyether mono-ols or polyether polyols.

One class of suitable hydroxyl-substituted organic solvents for the sulfolanyloxyalkyl-polyalkylsiloxanes of the invention are mixed ethylene oxide-propylene oxide adducts of butanol having the average formula $C_4H_9(OC_3H_6)_m(OC_2H_4)_nOH$, where $n$ has an average value from about 3 to about 50 and $m$ has an average value from about 3 to about 40. Preferably, the values of $m$ and $n$ are such that the average molecular weight of these mono-ols is not substantially greater than about 2000 and the oxyethylene content is from about 20 to about 80 weight percent, based on total polyoxyalkylene content. Usually, the values of $m$ and $n$ are chosen such that the weight percent of oxyethylene is about the same as the weight percent of oxypropylene.

Another class of suitable solvents for the sulfolanyloxyalkyl-polyalkylsiloxanes of the invention are organic surfactants which, when used, are usually of the non ionic variety. Such non ionics include: the polyoxyethylene ethers of higher alcohols having from 10 to 18 carbon atoms including mixtures thereof; and polyoxyethylene ethers of alkyl-substituted phenols. Typical of such non ionic organic surfactants for use as the carrier medium for the siloxanes described herein are the ethylene oxide adducts of nonylphenol having the average composition, $C_9H_{19}$—$C_6H_4$-$(OC_2H_4)_t$—OH, wherein $t$ has an average value from about 4 to about 20, inclusive of whole and fractional numbers, such as 6, 9, 10.5 and 15.

The generally preferred solvents for the sulfolanyloxyalkyl-polyalkylsiloxanes of the invention are: polyether triols such as glycerol-started poly(oxypropylene); and the class of polyether polyols having a primary hydroxyl content of at least about 35 mole percent, that is, the polyether polyols defined hereinabove as Polyol I.

The high resilience foam produced in accordance with the method of this invention can be produced by techniques known to the cellular urethane art. The preferred technique is the one-step or one-shot process wherein all of the formulation components are reacted simultaneously with the foaming operation. It is to be understood that the ingredients of the foam-forming formulation can be mixed in any suitable manner prior to commencing the cure reaction. Sometimes it is preferred to employ various premixes such as a premixture of the organic polyol reactant and sulfolanyloxyalkyl-polyalkylsiloxane fluid stabilizer; a premixture of the organic polyol reactant, siloxane fluid stabilizer, blowing agent and catalyst; a premixture of the polyisocyanate and siloxane fluid stabilizer; a premixture of the siloxane fluid stabilizer, solvent and amine catalyst; and the like. Because of the high exothermic nature of the urethane-forming reaction, high resilience urethane foams are rapidly produced without the need to apply an external source of heat to obtain a satisfactory cure of the foam product whether slabstock or molded. Of course, if desired, the overall reaction can be even further accelerated by preheating the mold in the case of forming molded high resilience foam and/or by applying conventional high temperature post curing procedures. With or without post cure, however, high resilience foam formation achieves a greater degree of cure throughout the entire foam and shorter tack free and demolding times, than is generally achieved in forming conventional flexible polyether slabstock and molded foam.

The polyurethanes produced in accordance with the teachings of this invention can be employed as a cushioning material such as for automobile seat cushions and furniture cushions, interior automative padding, mattresses, as well as in carpeting and other end use applications associated with cellular polyurethanes generally.

The following examples are illustrative of the present invention.

It is to be understood that in the formulas included in the data which follows, "Me" designates methyl (—CH₃).

The platinum catalyst employed to effect the hydrosilation reactions described under part (B) of each of the following Examples 1 and 2, was prepared by reacting 10 grams of chloroplatinic acid hexahydrate and 100 grams of octanol at an elevated temperature and reduced pressure. After removal of octanol by distillation (45° C./0.3 mm. pressure), the residual product (35.3 grams) was dissolved in toluene. As used in the examples, the expression "reduced platinum catalyst solution" refers to the resultant toluene solution of the chloroplatinic acid-octanol reaction product and contains about 0.014 gram of platinum per gram of solution.

EXAMPLE 1

This example described an illustrative sulfolanyloxy-propyl-modified polymethylsiloxane oil of the invention, designated herein as Polymer A.

A. Preparation of Si-H Reactant

The polymethylsiloxane hydride employed in preparing Polymer A was formed by equilibration of a reaction mixture containing the following Reactants (1), (2) and (3).

Reactant (1): Hexamethyldisiloxane in an amount of 48.6 grams (0.3 mole), corresponding to a total of 0.6 mole of $Me_3SiO_{\frac{1}{2}}$.

Reactant (2): Dimethylsiloxane cyclic polymers (purity 99+ percent) in an amount of 60.9 grams, corresponding to 0.82 mole of $Me_2SiO_{2/2}$.

Reactant (3): Polymeric methylsiloxane hydride in an amount of 21.6 grams, corresponding to 0.36 mole of $Me(H)SiO_{2/2}$.

The reaction mixture was equilibrated at ambient temperature while stirring overnight (about 18 hours) in the presence of concentrated sulfuric acid (about 2.5 grams). The equilibrated product was then stirred for about 6 hours with several grams of sodium bicarbonate, treated with filter aid and activated charcoal and then pressure filtered. Based on the relative molar proportions of Reactants (1), (2) and (3), normalized to two moles of monofunctional units, the equilibrated product comprises a polymer having the following average empirical formula,

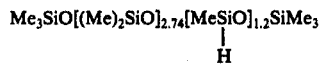

B. Preparation of Polymer A

To a 100 ml. three-necked reaction flask fitted with a heating mantle, mgnetic stirrer, thermometer, condenser and nitrogen blow-by, there were added 36.4 grams of the polysiloxane hydride described under part (A) of this example corresponding to about 0.1 mole of $Me(H)SiO_{2/2}$, and 0.1 ml. of reduced platinum catalyst solution. Heat was then applied to raise the temperature to 105° C. and 3-allyloxysulfolane (21.1 grams, 0.12 mole) containing about 0.2 ml. of the platinum catalyst solution was gradually added over a period of twenty minutes. At the end of this period, the temperature was 120° C. After an additional reaction period of ½ hour, standard analysis (KOH—$C_2H_5OH$—$H_2O$) for silanic hydrogen content showed 0.5 ml. of $H_2$ per 0.5 ml. of sample. The reaction mixture was recatalyzed with platinum catalyst and the reaction continued for about another two hours. At the end of this period, residual Si-H content was reduced to 0.2 ml. of hydrogen per 0.5 ml. of sample. After heating for another 35 minutes, the reaction mixture was cooled to ambient temperature, treated with sodium bicarbonate, filter aid and activated charcoal, and was then pressure filtered. The product was a clear dark fluid. Based upon the above-assigned average composition of the polysiloxane hydride employed in its preparation, the product comprises a 3-(sulfolan-3-yloxy)propyl-modified polymethylsiloxane having the following average composition,

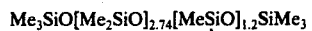
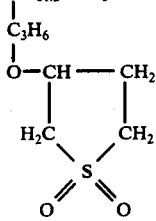

The product of this example is referred to herein as Polymer A.

EXAMPLE 2

This example describes a further illustrative sulfolanyloxypropyl-modified polymethylsiloxane oil of the invention, designated herein as Polymer B.

A. Preparation of Si-H Reactant

The polymethylsiloxane hydride employed in preparing Polymer B was formed by equilibration of a reaction mixture containing reactants (1), (2) and (3) identified below.

Reactant (1). Hexamethyldisiloxane in an amount of 274.5 grams (1.7 moles), corresponding to a total of 3.4 moles of $Me_3SiO_{1/2}$.

Reactant (2). Dimethylsiloxane cyclic polymers in a total amount of 317.7 grams (purity, 96 weight percent). Based on the 96 percent content of cyclics, the aforesaid amount of this reactant corresponds to 4.1 moles of $Me_2SiO_{2/2}$.

Reactant (3). Polymeric methylsiloxane hydride in an amount of 157.8 grams, corresponding to 2.6 moles of $Me(H)SiO_{2/2}$.

The reaction mixture was equilibrated with stirring for two hours at about 85° C. in the presence of trifluoromethylsulfonic acid (about 150 drops). The equilibrated product was then neutralized with sodium bicarbonate (45 grams) and filtered. The filtered product had a viscosity of 2.24 centistokes (at 25° C). Based on the relative molar proportions of Reactants (1), (2) and (3), normalized to two moles of monofunctional units, the equilibrated product comprises a polymer having the following average empirical formula,

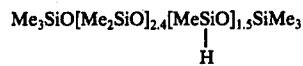

B. Preparation of Polymer B

To a 100 ml. three-necked reaction flask fitted with a heating mantle, magnetic stirrer, thermometer, condenser and nitrogen blow-by, there was added 29.0 grams of the polysiloxane hydride described under part (A) of this example corresponding to about 0.1 mole of $Me(H)SiO_{2/2}$. The flask was heated to 112° C;. and, after adding several droplets of reduced platinum catalyst solution, 3-allyloxysulfolane (21 grams, 0.12 mole) containing 0.25 ml. of the platinum catalyst solution was gradually added over a period of ½ hour. At the end of this period, the temperature was 115° C. Heating was continued for about another 1¾ hours during which the temperature reached a maximum of 140° C. Standard analysis for silanic hydrogen content showed less than 0.2 ml. $H_2$ per 0.5 ml. of sample. The reaction mixture was cooled to ambient temperature, treated with sodium bicarbonate, filter aid and activated charcoal, and was then pressure filtered. The product was a clear dark brown fluid and is referred to herein as Polymer B. Based upon the above-assigned average composition of the polysiloxane hydride employed in its preparation, Polymer B comprises a 3-(sulfolan-3-yloxy)propylmodified polymethylsiloxane having the following average composition.

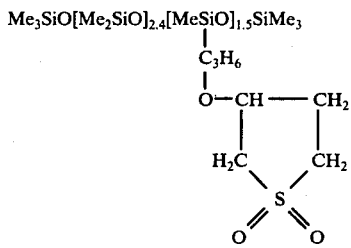

Analysis of Polymer B by nuclear magnetic resonance was consistent with this assigned composition.

EXAMPLE 3

The purpose of this example is to illustrate the utility of the polymer compositions of this invention in forming high-resilience foam. For this purpose, Polymer A of example 1 was used (in the form of a 22 weight percent solution in a polyether triol) as the foam stabilizing component of a high resilience formulation. The other components of the formulation are identified in Table I which follows.

TABLE I
HIGH-RESILIENCE FOAM FORMULATION

| Component | Parts By Weight |
| --- | --- |
| Polyol A: An ethylene oxide-capped, glycerol-started poly(oxypropylene) triol having a Hydroxyl No. of about 34, a molecular weight of about 5000, and a primary hydroxyl content of 70-75 mole percent. | 60 |
| Polyol B: A polymer/polyether polyol having a Hydroxyl No. of about 28 and based on (parts by weight): styrene (10), acrylonitrile (10) and Polyol A (80) produced by polymerizing said monomers in Polyol A. | 40 |
| Polyisocyanate: A mixture of: (1) 80 weight percent of the 2,4- and 2,6-isomers of tolylene diisocyanate, the weight ratio of said isomers being 80:20, respectively; and (2) 20 weight percent of a polyphenyl-methylene polyisocyanate containing about 2.6 to 2.9 moles of —NCO per mole of polymer and having an average isocyanate content of about 31.4 weight percent. | 34.7 |
| Water | 2.6 |
| Dibutyltin dilaurate | 0.015 |
| Polymer A /1/ | 0.165 |
| Amine Catalyst System: | |
| Amine Catalyst A: A 33 weight percent solution of 3-dimethylamino-N,N-dimethylpropionamide in TERGITOL TP-9 /2/. | 0.30 |
| Amine CatalystB: A 33 weight percent solution of triethylenediamine in dipropylene glycol. | 0.36 |
| Amine Catalyst C: Bis[2-(N,N-dimethylamino)-ethyl]ether. | 0.07 |

/1/ Polymer A (described under example 1) was added to the formulation as a solvent solution in a glycerol-started poly(oxypropylene) triol having a Hydroxyl No. of about 56. The said solution contained 22 weight percent of Polymer A and 78 weight percent of said triol solvent and was used in an amount of 0.75 parts by weight per 100 parts by weight of total Polyol A and Polyol B contained in the formulation.
/2/ An ethylene oxide adduct of nonylphenyl containing an average of 9 moles of ethylene oxide per mole of nonylphenol.

The procedure employed in preparing the foam of this example entailed the following manipulative steps: A blend of Polyols A and b was dispensed into a paper cup at about 20° to 30° C. Using a syringe, the solution of surfactant and the dibutyltin dilaurate were added to the polyol blend and dispersed therein with a spatula, followed by the addition of a premixture of the blowing agent (water) and amine catalysts which was also dispersed without using a baffle. The mixture was then placed under a drill press and agitated for ten seconds at 2150 revolutions per minute with circular movement of the cup to ensure proper mixing. Without interruption of the mixing cycle, the polyisocyanate reactant was added rapidly and mixing continued for an additional seven seconds. The foam forming mixture was then rapidly poured into a box (8 × 8 × 6 inches) supported by a wooden mold. The foam was allowed to rest in the supported container for at least two minutes after the apparent completion of foam rise to avoid densification at the bottom of the foam bun. While still in the box the foam was thereafter placed in an oven at 125° C. for ten minutes to reduce thickness and to facilitate removal of the foam. The foam was allowed to stand at ambient temperature for about one hour before cutting samples for breathability measurement. Breathability was determined by a Gurley Densometer which measures the porosity or air resistance of the foam as shown by the time in seconds for a given volume of air (30 cc's of air) to pass into a standard area of foam. The value recorded is the average value of five such measurements given in seconds per 300 cc's of displaced air.

The foam product provided with Polymer A of the invention and prepared as described above, was of good quality and breathability, as reflected by the following results of this Example 3:

Height of rise = 7.1 inches
Gurley breathability = 11.1 seconds
Top collapse = None
Bottom collapse = None
Cell fineness = Good
Cell uniformity = Good
Voids = None

EXAMPLE 4

In this example, the foam preparation described under Example 3 was repeated except that, in place of Polymer A, above-described Polymer B was employed as the surfactant component of the high resilience foam formulation (Table I). Polymer B was also introduced to the formulation as a 22 weight percent solution in the polyether triol identified in footnote 1 of Table I. The said solution was used in an amount of 0.75 parts per 100 parts of Polyol A and Polyol B, thereby providing 0.165 parts of Polymer B to the formulation. The foam was prepared following the procedure described under Example 3. The results are as follows:

Height of rise = 6.6 inches
Gurley breathability = 5.2 seconds
Top collapse = 0.3 inch
Bottom collapse = None
Cells per inch = 18
Cell fineness = Good
Cell uniformity = Good
Voids = Yes The above results indicate that, although void formation was observed, Polymer B otherwise provided a foam of satisfactory rise and breathability and good cell structure.

What is claimed is:
1. Sulfolanyloxyalkyl-polyalkylsiloxanes having the average composition,

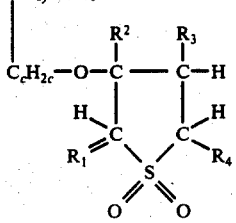

wherein:
R is alkyl of one to four carbon atoms;
c has a value from two to eight;
x has an average value from about 0.5 to about 10;
y has an average value from about 0.5 to about 10; and
R', R², R³ and R⁴ are independently hydrogen or alkyl having from one to four carbon atoms 2. Sulfolanyloxyalkyl-polyalkylsiloxanes as defined in claim 1 in which c has a value of no more than six.

3. Sulfolanyloxyalkyl-polyalkylsiloxanes as defined in claim 1 in which c has a value of three.

4. Sulfolanyloxyalkyl-polyalkylsiloxanes as defined in claim 1 in which x has an average value from about one to about 8.5, and y has an average value no more than about six.

5. Sulfolanyloxyalkyl-polyalkylsiloxanes as defined in claim 4 in which c has a value of three or four.

6. Sulfolanyloxyalkyl-polyalkylsiloxanes as defined in claim 1 in which each of R¹ through R⁴ of said sulfolanyloxyalkyl groups is hydrogen.

7. Sulfolanyloxyalkyl-polymethylsiloxanes having the average composition.

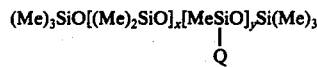

wherein: Me is methyl; x has an average value from about 0.5 to about 10; y has an average value from about 0.5 to about 10; and Q has the formula,

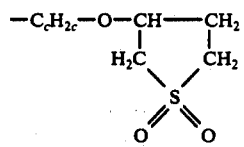

in which c has a value from two to six.

8. Sulfolanyloxyalkyl-polymethylsiloxanes as defined in claim 7 in which c has a value of three.

9. Sulfolanyloxyalkyl-polymethylsiloxanes as defined in claim 7 in which x has an average value of from about one to about 8.5, y has an average no more than about six, and c has a value of three or four.

10. Sulfolanyloxyalkyl-polymethylsiloxanes having the average composition.

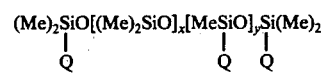

wherein: Me is methyl; x has an average value from about 0.5 to about 10; y is zero or has an average value up to about 8; and Q has the formula,

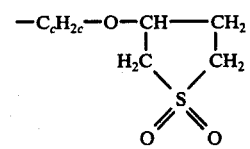

in which c has a value from two to six.

11. Sulfolanyloxyalkyl-polymethylsiloxanes having the average composition,

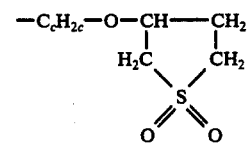

wherein: q and r are positive numbers provided the sum q+r per average mole of said composition is two; x has an average value from about 0.5 to about 10; y is zero or a positive number provided the average value of the sum y+q is at least about 0.5 and no more than about 10; Me is methyl; and Q has the formula,

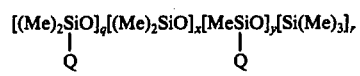

in which c has a value from two to six.

* * * * *

UNITED STATES PATENT OFFICE
CERTIFICATE OF CORRECTION

Patent No. 4,049,675   Dated September 20, 1977

Inventor(s) Bernard Kanner and Bela Prokai

It is certified that error appears in the above-identified patent and that said Letters Patent are hereby corrected as shown below:

Title Page, for the title of the patent read -- SULFOLANYLOXYALKYL-POLYALKYLSILOXANES --; in the entry opposite the heading "Notice", second line thereof, for "Sept. 14, 1993" read -- Sept. 20, 1994 --; in the Abstract, sixth line thereof, for "folanyloxyalky" read -- folanyloxyalkyl --. Column 2, line 19, for "592.129" read -- 592,129 --; line 27, for "592.092" read -- 592,092 --. Column 5, line 32, after "more", for "that" read -- than --. Column 6, line 3, for "alkyl" read -- alkyls --; lines 54-61, that portion of the formula reading Column 7, line 39, for "formula" read -- Formulas --. Column 8, line 14, for "ot" read -- to --; line 28, after the plus (+) sign, for "Y" read -- y --; line 68, for "II" read -- III --. Column 9, line 32, for "Y" read -- y --; line 33, for "soley" read -- solely --. Column 12, line 7, the formula reading

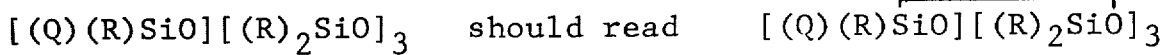

Column 12, line 9, for "reation" read -- reaction --; lines 10-11, the formula reading

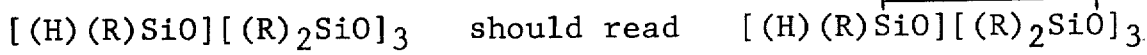

Column 13, lines 23-31, that portion of the formula reading

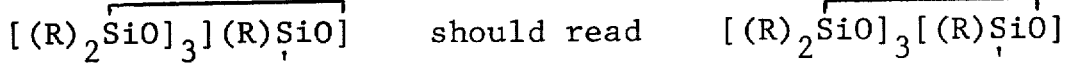

Column 17, line 59, for "R+" read -- R° --. Column 18,

UNITED STATES PATENT OFFICE
CERTIFICATE OF CORRECTION

Patent No. 4,049,675  Dated September 20, 1977

Inventor(s) Bernard Kanner and Bela Prokai

It is certified that error appears in the above-identified patent and that said Letters Patent are hereby corrected as shown below:

line 6, for "axobis" read -- azobis --; line 66, for "triphenylmethan-" read -- triphenylmethane- --. Column 20, line 5, for "rectant" read -- reactant --; line 16, for "polyisocyante" read -- polyisocyanate --; line 49, for "Popplesdorf" read -- Poppelsdorf --; line 56, after "1973," read -- , now U. S. Patent No. 3,925,268, granted December 9, 1975, such as, --; line 65, for "is[2-" read -- bis[2- --; line 66, after "N," read -- N-dimethylpropionamide. --; line 66, for "amide" read -- amine --. Column 21, line 15, for "dialurltin" read -- dilauryltin --; line 63, after "of" read -- the --. Column 24, line 53, for "automative" read -- automotive --. Column 25, line 42, for "mgnetic" read -- magnetic --. Column 27, line 66, for "b" read -- B --. Column 28, line 17, for "thickness" read -- tackiness --. Column 29, lines 1-10, that portion of the formula reading

UNITED STATES PATENT OFFICE
CERTIFICATE OF CORRECTION

Patent No. 4,049,675   Dated September 20, 1977

Inventor(s) Bernard Kanner and Bela Prokai

It is certified that error appears in the above-identified patent and that said Letters Patent are hereby corrected as shown below:

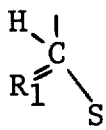   should read   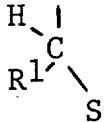

Column 29, line 17, for "R'" read -- $R^1$ --. Column 30, line 6, after "average" read -- value --; lines 30-34, in lieu of this formula read the formula at column 30, lines 42-44; lines 42-44, in lieu of this formula read the formula at column 30, lines 30-34.

Signed and Sealed this

Twenty-third Day of May 1978

[SEAL]

Attest:

RUTH C. MASON
Attesting Officer

LUTRELLE F. PARKER
Acting Commissioner of Patents and Trademarks